United States Patent [19]

Derossi

[11] 4,414,752

[45] Nov. 15, 1983

[54] DEVICE FOR THE CORRECTION OF AN ERROR IN THE ELECTRIC TRANSMISSION OF AN INDICATION

[76] Inventor: Piero M. Derossi, Corso Giovanni Lanza 55, Torino, Italy

[21] Appl. No.: 180,393

[22] Filed: Aug. 22, 1980

Related U.S. Application Data

[63] Continuation of Ser. No. 974,081, Dec. 28, 1978, abandoned.

[30] Foreign Application Priority Data

Dec. 30, 1977 [IT] Italy ............................... 69959 A/77

[51] Int. Cl.³ .............................................. G01C 19/38
[52] U.S. Cl. ................................. 33/320; 33/317 R; 33/356
[58] Field of Search ................. 33/356, 357, 320, 318, 33/316, 317 D, 317 R, 324, 325, 326

[56] References Cited

U.S. PATENT DOCUMENTS

| | | | |
|---|---|---|---|
| 2,959,866 | 11/1960 | Seaman | 33/356 |
| 3,071,959 | 1/1963 | Depp | 33/357 X |
| 3,253,342 | 5/1966 | Depp | 33/356 |
| 3,621,584 | 11/1971 | Burt | 33/357 X |
| 4,006,631 | 2/1977 | Garner | 33/356 |
| 4,116,057 | 9/1978 | Sullivan | 33/356 |

*Primary Examiner*—William D. Martin, Jr.
*Attorney, Agent, or Firm*—Karl F. Ross

[57] ABSTRACT

To correct latitude-related errors in the delivery of data from a gyrocompass to an indicator through a synchro transmitter with three-phase Y-connected primary and secondary windings, the synchro transmitter is energized from a single-phase a-c source having one terminal connected to one primary winding and the other terminal connected to the two other primary windings with interposition of a variable resistance in series with one of the two latter windings. These two windings may be interchanged to correct errors of opposite sign.

7 Claims, 4 Drawing Figures

DEVICE FOR THE CORRECTION OF AN ERROR IN THE ELECTRIC TRANSMISSION OF AN INDICATION

This is a continuation of application Ser. No. 974,081, filed Dec. 28, 1978, now abandoned.

FIELD OF THE INVENTION

My present invention relates to a device designed to introduce an error correction in the transmission of an indication by means of electromagnetic devices of the synchro type. The invention applies particularly, but not exclusively, to the correction of the latitude error in the transmission of the indication of a gyrocompass of the type wherein the damping of the gyroscopic system is realized by means of the application of a torque around the azimuth axis.

BACKGROUND OF THE INVENTION

As is known, the aforesaid damping has the object of replacing the tendency of the gyroscopic axis of a gyrocompass to hunt along an elliptical path by a progressive approach to a stop position along a spiral path. However, the application of a torque for this purpose has the consequence that the orientation of the spin axis is displaced, with respect to the true meridian, eastward in the northern hemisphere and westward in the southern hemisphere. The error may be calculated, for a given compass, as a function of the latitude where the same is situated, and may be tabulated for the correction of the reading, or else the same may be directly corrected in various ways; furthermore, in cases where the compass is provided with an electrical device for the transmission of the indication to repeaters or loads, a corresponding correction must be introduced into this transmission. This may be done by displacing the entire binnacle of the compass through an angle equal and opposite to the calculated error, or by displacing through such an angle the connection between the synchro indication transmitter and the cardanic suspension of the gyrocompass, but this requires complex mechanisms with sealing difficulties due to the fact that the compass is normally immersed in a liquid. The correction may also be introduced by devices acting directly on the gyroscopic system, but this presents the drawback of putting out of service the entire equipment in case of a failure.

OBJECT OF THE INVENTION

The object of the present invention is to make possible, with simple and reliable means, the introduction of a correction of an error in the electrical transmission of an indication by means of electromagnetic devices of the synchro type.

I realize this object, in accordance with my present invention, by the provision of inductor means with a first, a second and a third winding angularly spaced in a Y-connection and centered on an axis defined by a shaft carrying these windings, the angular orientation of the inductor means on that shaft representing the indication—specifically that of a gyrocompass—to be transmitted. A free end of the first winding is connected by first circuit means to one terminal of a source of single-phase alternating current, the remaining windings having free ends which are connected to the other source terminal by second circuit means including a selector for introducing an impedance difference between the connections extending from the latter terminal to said second and third windings to impart a corrective angle to the orientation of a magnetic field jointly generated by the three windings. The orientation of this field is detected by conventional pick-up windings serving to emit signals which represent the indication to be transmitted, as modified by the aforementioned corrective angle.

In most cases, a correction realized with discrete impedance values is sufficient, but where a continuous correction would be required, the commutation means could assume the character of a rheostat with a continuous variation of the value of the electrical resistance.

In the particular case of the correction of a latitude error in the transmission of a gyrocompass indication, the selector switch may advantageously be directly graduated with the latitude values to which correspond the corrections so introduced into the transmission.

In the case of a compass serving also for steering purposes, and hence requiring also the introduction of a correction in the direct reading of the indication card, the latter correction may advantageously be made, according to my copending patent application Ser. No. 974,050, now U.S. Pat. No. 4,218,822, by means of a block with multiple luminous indices selectable by electrical switchover, and in that case the selector-switch means of the system for the corrections of direct reading and those of the system for the correction of the transmitted indication may be advantageously coupled and provided with a single control member which thus permits all the required corrections to be introduced with a single action.

BRIEF DESCRIPTION OF THE DRAWING

An embodiment of my invention is described hereinafter by way of a nonlimiting example and is schematically represented in the accompanying drawing in which.

SPECIFIC DESCRIPTION

Figure 1:
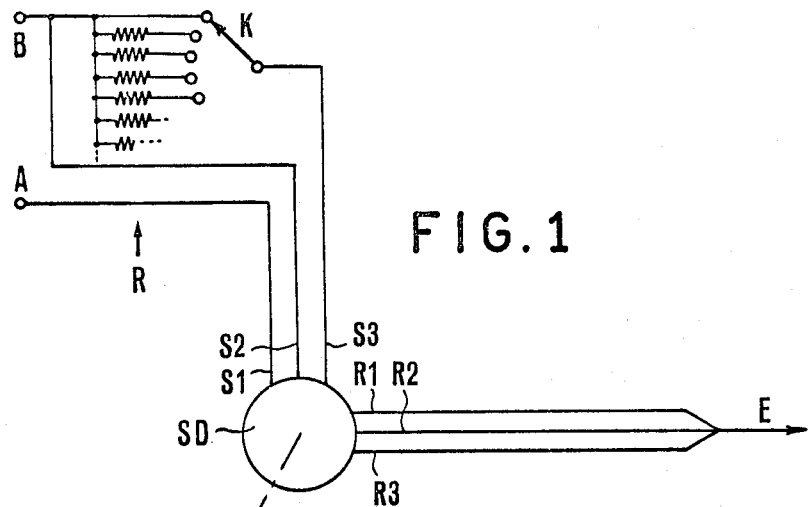
FIG. 1 illustrates the principle on which the invention is based.

In FIG. 1, reference SD indicates a differential synchro wherein S1, S2, S3 are respective ends of the inductor windings (whose other ends are interconnected in a Y) and M is the mechanical axis, i.e. a shaft coupled in the usual manner to the follower of the compass in the considered case of latitude-error correction. Winding S1 is directly connected to the pole A of a supply network of single-phase alternating current; winding S2 is directly connected to the other pole B of that network; and winding S3 is connected to a selector switch K which allows it to be connected to pole B either directly or in series with one or the other of a plurality of electrical resistances R. An assembly of leads R1, R2, R3 extending from nonillustrated pick-up windings of the differential synchro SD constitutes the electrical transmission axis E. The operating principle of the device according to the invention will be better understood from an inspection of FIGS. 2 and 3 respectively representing the two cases in which both windings S2 and S3 are directly connected to the pole B and in which the winding S3 is connected to pole B through a resistance R.

Figure 2:
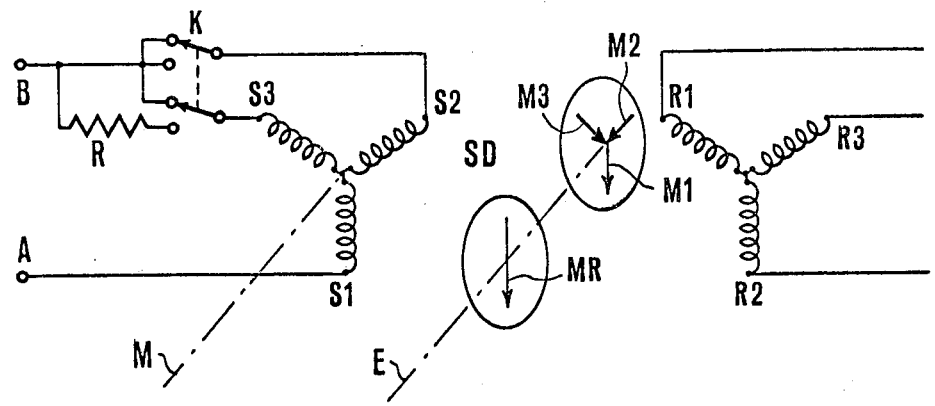
FIGS. 2 and 3 illustrate, in simplified form, how the displacement of the electrical axis is carried out according to the invention.

In the case of FIG. 2, the resulting magnetic field MR produced by the inductor of the differential synchro SD is the resultant of the individual magnetic fields M1, M2, M3 produced by the windings S1, S2, S3, with windings S2 and S3 equally energized. The magnetic fields M2 and M3 have therefore an equal absolute value and present mutually opposite components, which cancel each other, and parallel components codirectional with field M1, to which they are added. The resulting magnetic field MR is, accordingly, parallel to field M1. The electrical axis E of the differential synchro coincides angularly with its mechanical axis or shaft M. No modification is introduced in the transmission of the information represented by the angular position of shaft M.

Figure 3:
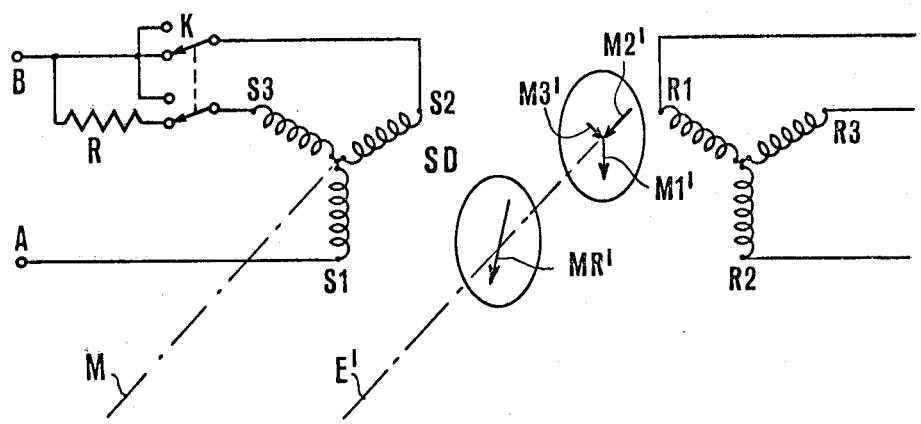

In the case of FIG. 3, the inductor winding S3 is fed through the resistance R and therefore is energized less than winding S2. It produces, consequently, a magnetic field M3' whose absolute value is less than that of the magnetic field M2'. The components of M2' and M3' parallel to and codirectional with M1' still are added to it, but the mutually opposite components of M2' and M3' no longer have an equal absolute value and a portion of the component of M2' perpendicular to M1' remains uncanceled. The resultant MR' is no longer parallel to M1' but is somewhat angularly displaced. The electrical axis E' of differential synchro SD is displaced with respect to its shaft M by a certain angle corresponding to the correction introduced into the transmission of the information represented by the angular position of the shaft M. By adjusting the value of R so that this angle of correction becomes equal and opposite to the angle corresponding to the error contained in the information conveyed by the shaft position, that error is corrected.

Figure 4:
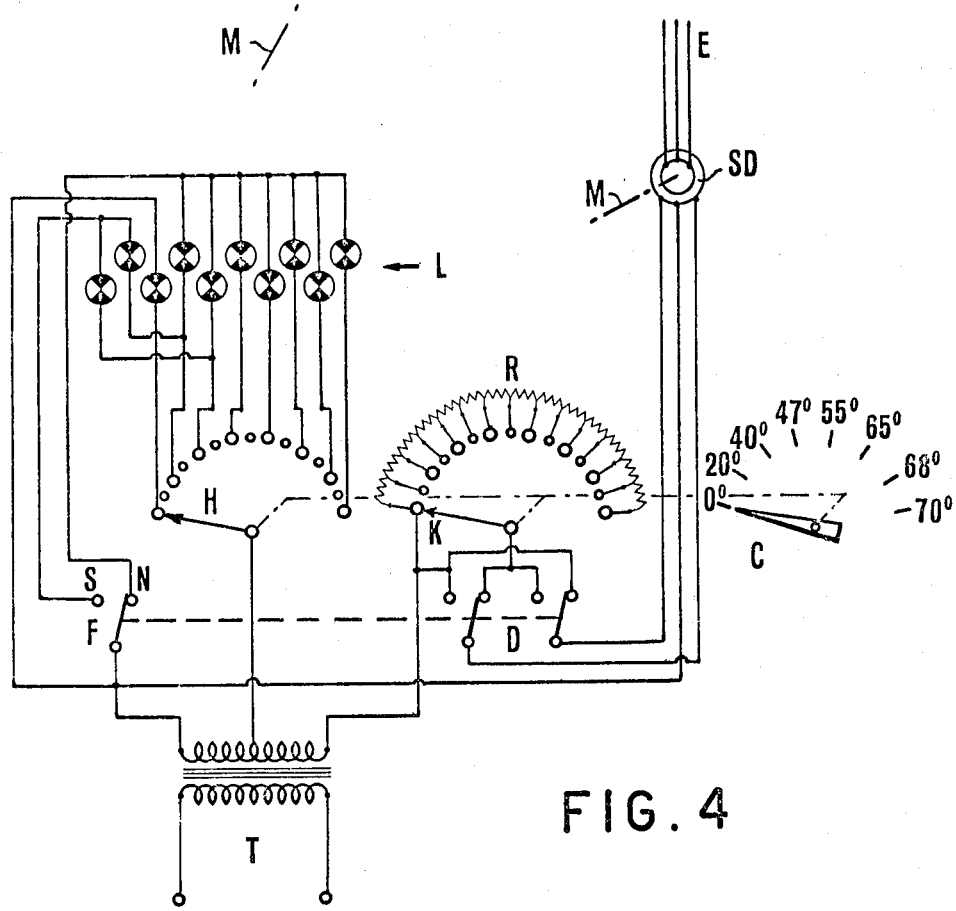
FIG. 4 shows how the device according to the invention may be realized, coupled with a device for the correction of the direct reading.

In the simplified representation of FIGS. 1 to 3, the error correction is possible in one sense only, since only the winding S3 can receive the insertion correction of a resistance R in series, but obviously the correction in the opposite sense is possible by inserting instead the resistance R in series with winding S2, e.g. by the aid of a changeover switch D, as shown in FIG. 4.

According to FIG. 4, the selector switch K which inserts the various resistances R is coupled with a control knob C moving on a graduation directly indicating the degrees of latitude on the basis of which a compass indication affected by a latitude error must be corrected. Changeover switch D is linked with another switch F which carries, in turn, indications S and N corresponding to the fact that the latitude considered may be either south or north. The system is energized through a transformer T which feeds also, through a selector switch H and switch F, one lamp of a series of lamps L designed to provide a system for the correction of a compass-card reading error, according to my aforementioned U.S. Pat. Ser. No. 4,218,822. The selector switches K and H are manipulated through the same knob C so that a single setting of the latitude produces, in different ways, both the correction of the direct reading and the correction of the gyrocompass-indication transmission.

It is to be understood that various modifications and substitutions of technical equivalents may be applied to the device described and illustrated by way of example, without thereby departing from the scope of my invention as defined in the appended claims.

I claim:

1. A device for the electrical transmission of an indication, comprising:

inductor means with a first, a second and a third winding angularly spaced apart on a shaft in a Y-connection and centered on an axis defined by said shaft, the angular orientation of said inductor means on said shaft representing the indication to be transmitted;

a source of single-phase alternating current having two terminals;

first circuit means connecting a free end of said first winding to one of said terminals;

second circuit means connecting free ends of said second and third windings to the other of said terminals, said second circuit means including selector means for introducing an impedance difference between the connections extending from said other of said terminals to said second and third windings to impart a corrective angle to the orientation of a magnetic field jointly generated by said windings; and pick-up winding means for detecting the orientation of said magnetic field and emitting signals representing said indication as modified by said corrective angle.

2. A device as defined in claim 1 wherein said selector means comprises a control member coacting with graduations in terms of a parameter determining said corrective angle.

3. A device for the electrical transmission of the indication of a gyrocompass, comprising:

inductor means on a shaft mechanically linked with said gyrocompass for rotation about an axis defined by said shaft, said inductor means including a first, a second and a third winding angularly spaced apart in a Y-connection and centered on said axis;

a source of single-phase alternating current having two terminals;

first circuit means connecting a free end of said first winding to one of said terminals;

second circuit means connecting free ends of said second and third windings to the other of said terminals, said second circuit means including selector means for introducing an impedance difference between the connections extending from said other of said terminals to said second and third windings to impart a corrective angle to the orientation of a magnetic field jointly generated by said windings; and pick-up winding means for detecting the orientation of said magnetic field and emitting signals representing the gyrocompass indication as modified by said corrective angle.

4. A device as defined in claim 3 wherein said selector means comprises a control member coacting with graduations in terms of geographical latitude.

5. A device as defined in claim 1, 2, 3 or 4 wherein said selector means includes first switch means for choosing among a multiplicity of impedance values and second switch means for introducing the chosen impedance value in series with either one of said second and third windings.

6. A device as defined in claim 5 wherein said indication is furnished by a gyrocompass, said second switch means having alternate positions for the northern and the southern hemisphere.

7. A device as defined in claim 1, 2, 3 or 4 wherein said selector means has a multiplicity of settings for choosing among as many different impedance values, further comprising a multiplicity of luminous indicator and energizing means coupled with said selector means for actuating a respective luminous indicator in any of said settings.

* * * * *